June 15, 1943.                C. M. LEE                2,322,034
ENLARGER LENS AND DIAPHRAGM ASSEMBLY
Filed Aug. 29, 1941
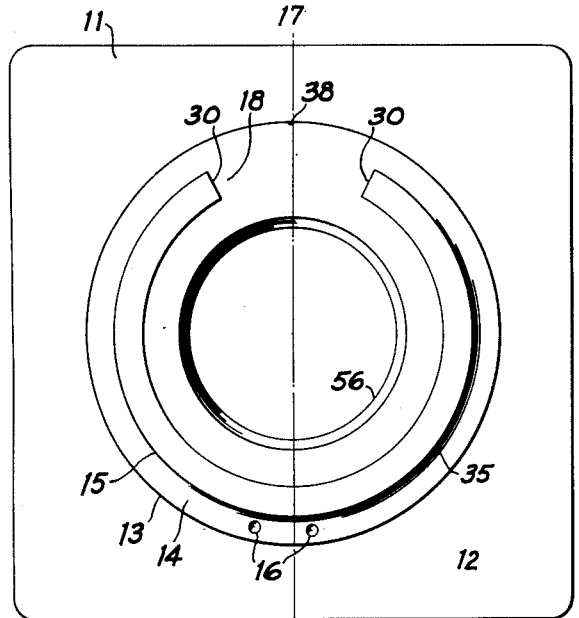
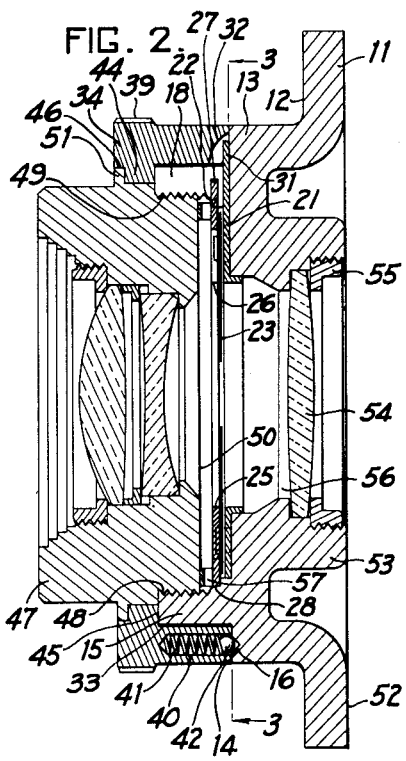
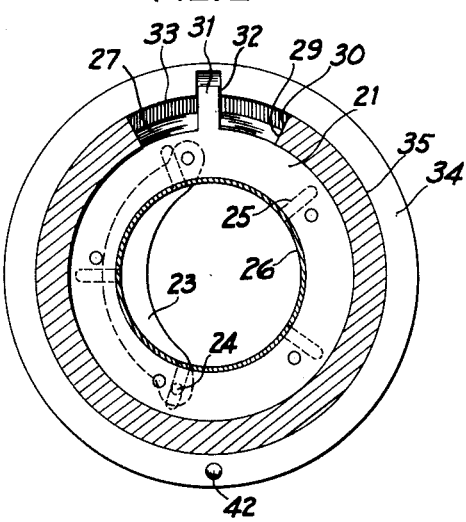
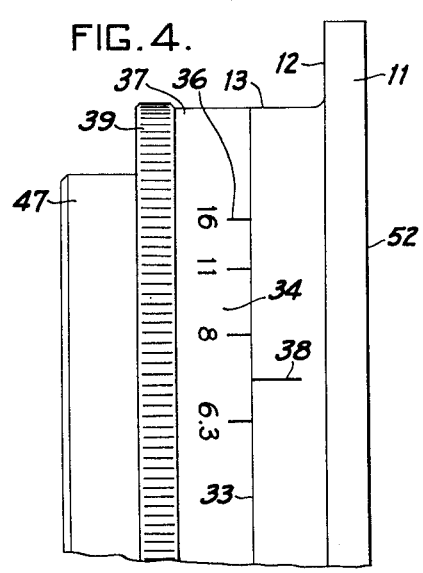
CHARLES M. LEE
*INVENTOR*
BY
*ATTORNEYS*

Patented June 15, 1943

2,322,034

UNITED STATES PATENT OFFICE 2,322,034

ENLARGER LENS AND DIAPHRAGM ASSEMBLY

Charles M. Lee, Rochester, N. Y., assignor to Eastman Kodak Company, Rochester, N. Y., a corporation of New Jersey Application August 29, 1941, Serial No. 408,826

10 Claims. (Cl. 95—64)

The present invention relates to photography, and more particularly to a lens and diaphragm assembly especially designed for use on enlargers.

One object of the invention is the provision of a new and improved assembly of the class described, which is simple in construction, and comprises few parts which may be easily, readily and inexpensively assembled.

Another object of the invention is the provision of a diaphragm-adjusting or positioning mechanism by which the diaphragm opening may be readily, easily and accurately adjusted even in the dark.

A further object of the invention is the provision of a diaphragm-adjusting means which not only facilitates the rapid adjustment of the diaphragm opening, but which positively indicates to the operator the particular diaphragm opening formed, thus effectively eliminating errors of adjustment.

Yet another object of the invention is the provision of a lens and diaphragm assembly in which the diaphragm and diaphragm-adjusting mechanism are effectively and positively retained in operative position by securing the lens mount in position in the assembly.

To these and other ends, the invention resides in certain improvements the combinations of parts, all as will be hereinafter more fully described, the novel features being pointed out in the claims at the end of the specification.

Fig. 1 is a front view of the lens board and ring or lens barrel which afford a support for the lens, as well as the diaphragm and its operating member, showing the limiting and intermediate positioning means for the diaphragm-adjusting mechanism;

Fig. 2 is a longitudinal sectional view through the complete lens and diaphragm assembly, showing the relation of the various parts;

Fig. 3 is a transverse sectional view taken substantially on line 3—3 of Fig. 2, showing the relation of the diaphragm parts and the arrangement for providing two limiting adjustment positions for the diaphragm and the connection between the diaphragm and the diaphragm-operating member; and Fig. 4 is a partial exterior view of the complete lens and diaphragm assembly.

Similar reference numerals throughout the various views indicate the same parts.

The present invention relates to a new and improved lens and diaphragm assembly for use in photographic enlargers. This assembly comprises, in general, a combination molded lens barrel and lens board which require little, if any, machining. Depressions are molded in the front face of the lens barrel to provide for "click" diaphragm stops. An annular ring is formed on the lens barrel and it is adapted to threadedly receive a front lens mount which serves to retain the diaphragm members in place in and a diaphragm-operating member in rotative relation on the ring. The latter is provided with a segmental slot into which a lug on one of the diaphragm members extends to hold said member against rotation. The other diaphragm member is formed with a tongue which extends through the slot in the ring and into operating engagement with the diaphragm-operating member so that the rotative movement of the latter will serve to move the diaphragm blades to adjust the opening thereof, all of which will be later more fully described.

In the preferred embodiment of the invention, a single molded member is formed to provide a square, or other suitably shaped, lens board or plate 11, from the front face 12 of which extends a tubular member 13 which, in turn, has formed on the front 14 thereof an annular ring 15 of less diameter than the member 13, all as shown in Fig. 1. The board 11 may be secured to the bellows of an enlarger in any suitable, well-known manner. The face 14 of the tubular member 13 has molded therein a pair of depressions 16 positioned below the ring 15 and spaced unequal distances from the vertical center line 17—17 of the member 13, as shown in Fig. 1. The ring 15 is not complete, but rather has a section thereof omitted to provide a segmental slot 18 which extends through the ring. While the above described members are preferably molded as a single unit, it is contemplated that they may be separately formed and suitably connected together.

The ring 15 has an internal diameter of such size as to snugly receive a pair of diaphragm members comprising a diaphragm plate 21 and a diaphragm retainer 22 which are arranged in well-known overlying relation, as shown in Fig. 2. The plate 21 has pivoted thereon a plurality of diaphragm blades 23, only one of which is shown, the free ends of which carry pins 24 adapted to be positioned in the slots 25 which extend inwardly from the inner edge 26 of the retainer 22, as shown in Fig. 3. This particular diaphragm construction is well known in the art and a further description is not deemed essential to an understanding of the present invention.

The retainer 22 is formed with an arcuate shaped lug 27 which projects radially from the outer edge 28 of the retainer 22, and into the segmental slot 18 of the ring 15. The lug 27 is exactly the same size and shape as the slot 18 so that the sides 29 of the lug will engage the sides or edges 30 of the slot 18 of the ring 15 as shown in Fig. 3, to effectively hold the retainer 22 stationary and against rotation. The plate 21, on the other hand, is formed with a narrow or thin radially extending tongue or finger 31 which projects through the slot 18 and into a registering notch 32 which extends inwardly from the inner surface 33 of the annular diaphragm-operating member 34 which is loosely mounted on the outer surface 35 of the ring 15, as best shown in Fig. 3. By means of this arrangement, the diaphragm operating member 34 is operatively connected to the plate 21 so that rotation of member 34 on the ring 15 will move the plate 21 as a unit therewith and relative to the stationary retainer 22 to pivot the blades 23 to adjust the opening thereof, as will be readily apparent to those in the art.

As the operating member 34 is rotated, the finger 31 moves transversely across the slot 18 until it finally engages the side or edges 30 thereof, as will be apparent from inspection of Figs. 1 and 3. The edges 30 thus afford limiting means by which the movement or adjustment of the diaphragm in opposite directions may be controlled so as to provide two points of adjustment for the diaphragm. These points are the limiting point of adjustment as shown by the points 16 and 6.3 on the scale 36 formed on the outer surface 37 of the member 34. When the finger 31 engages one edge 30, the right edge in Fig. 3, the designation 16 of the scale 36 will then register with a fixed line 38 formed on the tubular member 13, but when the finger 31 moves to the opposite extreme position to engage the other edge 30, the left edge in Fig. 3, the designated 6.3 on the scale 36 will then register with the mark 38. The side edges 30 of the slot 18 thus cooperate with the finger 31 to provide two limiting points of adjustment for the diaphragm blades 23.

It is often desirable, however, to also provide additional or intermediate points of adjustment for the diaphragm. Such adjustments are often made in the dark, and it is desirable to provide an arrangement by which the operator may feel and/or hear when these adjustments are correctly made. To this end, a pair of intermediate "click" stops are provided, these stops representing, for example, diaphragm openings of 11 and 8, and indicated by the intermediate points on the scale 36. To provide such "click" stops, the rim 39 of the operative member 34 is formed with an axially extending recess 40 in which is positioned a spring 41 adapted to force a ball 42 into one of the recesses or depressions 16 molded in the front face 14 of the tubular member 13. It is apparent that when the member 34 is rotated to move the finger 31 away from one of the sides 30, the ball 42 will ride along the front face 14 of the member 13. However, when the member 34 has been moved sufficiently to bring the ball 42 into registry with one of the depressions 16, the ball will snap into the registering depression under the action of the spring 41. Such engagement can readily be felt by the operator, and is accompanied by a faint, audible click, thus clearly indicating to the operator that an intermediate stop position has been reached. From the original position of the member 34 and the direction of rotation thereof, the proper or desired intermediate stop position can be easily and quickly located. Thus, four readily determinable diaphragm positions are provided, two extreme or limiting positions being provided by the sides 30 of the slot 18, and two intermediate positions being formed by the engagement of the spring-pressed ball 42 in the depressions 16. An important feature of the above described stop arrangement is that the various stops can be readily, easily, quickly, and accurately made even in the dark. Obviously, adjustments between the four points above described can also be made, but the exact diaphragm openings at these points are not readily ascertainable. If desired, however, additional intermediate "click" stops could be provided, but it is obvious that the greater the number of such intermediate stops, the greater the chance of error in determining the proper diaphragm opening or adjustment.

As mentioned above, the diaphragm-operating ring 34 is rotatably mounted on the outer surface of the ring 15. When in position thereon, the outer surface 37 of the member 34 is of the same diameter as and forms, in effect, a continuation of the outer surface of the member 13, as clearly shown in Fig. 2. The member 13 constitutes a support for the ring 15, and as it is found integral therewith, these two members may be broadly considered as a lens barrel adapted to receive a lens mount to be later described. The front end of the member 34 is formed with an inwardly-extending angular rib 44 which is arranged to overlie the front edge or face 45 of the ring 15, as shown in Fig. 2, and which is cut away to provide an angular groove or recess 46.

A front lens mount 47 has a threaded portion 48 formed thereon adapted to engage a correspondingly threaded portion formed on the inter surface 49 of the ring 15, as shown in Fig. 2. When the mount is secured in place in ring 15, the rear face 50 of the mount may engage the diagram retainer 22 to lock the diaphragm parts in proper position between the lens mount and the face 14 of the tubular member 13. It is preferred, however, to position a thin annular spring 57 between the retainer 22 and the rear face 50 of the front lens mount 47, as shown in Fig. 2. When the parts are thus positioned, a radially extending rib 51 formed on the front lens mount 47 in positioned in the groove 46 to effectively lock the member 34 in position on the outer surface of the ring 15. The front lens mount 47 thus effectively retains the diaphragm members in position in, and the diaphragm-operating ring in rotative position on the ring 15. The rear face 52 of the lens board 11 has formed integral therewith an annular boss 53 adapted to receive a rear lens element 54 which is held in place by a threaded retainer ring 55, as shown in Fig. 2. The lens board 11 has formed therein a circular opening 56 which is in optical alignment with the openings of the annular boss 53, the tubular member 13, the diaphragm parts, and the front lens mount 47, so as to afford a continuous passage for the light rays through the assembly, as will be apparent from inspection of Fig. 2.

It will thus be apparent from the above description, that the present invention provides an arrangement in which the desired diaphragm adjustment may be readily, easily, and accurately made even in the dark. The entire assembly comprises few parts which may be readily and inexpensively assembled. In addition, the placing of the front lens mount in position serves both to lock the diaphragm in place, and to retain the diaphragm-operating member in rotative position on the annular ring so that it may be utilized to actuate the diaphragm to adjust the opening of the diaphragm blades.

While one embodiment of the invention has been disclosed, it is to be understood that the inventive idea may be carried out in a number of ways. This application is, therefore, not to be limited to the precise details described, but is intended to cover all variations and modifications thereof, falling within the scope of the appended claims.

I claim:

1. In an iris diaphragm assembly, the combination with a cylindrical support, a ring formed on said support, a diaphragm positioned in said ring and comprising a diaphragm plate and a diaphragm retainer, a diaphragm operating member mounted for rotative movement on said ring, means for operatively connecting said plate to said member so that rotative movement of the latter will move said plate to adjust said diaphragm, means on said ring both for holding said retainer against rotation and for limiting the movement of said plate to provide points of adjustment for said diaphragm, and a single means cooperating with said support for retaining the diaphragm in and the diaphragm operating member in rotative position on said ring.

2. In an iris diaphragm assembly, the combination with a cylindrical support, a ring formed on said support, a diaphragm positioned in said ring and comprising a diaphragm plate and a diaphragm retainer, a diaphragm operating member mounted for rotative movement on said ring, and means for operatively connecting said plate to said member so that rotative movement of the latter will move said plate to adjust said diaphragm; said ring being formed with a slot adapted to receive a portion of said retainer to hold the latter against rotation and having parts cooperating with said connecting means to limit the movement of said plate to position the latter to adjust said diaphragm.

3. In an iris diaphragm assembly, the combination with a cylindrical support, a ring formed on said support, a diaphragm positioned in said ring and comprising a diaphragm plate and a diaphragm retainer, a diaphragm operating member mounted for rotative movement on said ring, said ring being formed with a radial slot extending therethrough, a radial lug on said retainer positioned to extend into said slot to hold said retainer against rotation, a diaphragm operating ring mounted for rotative movement on said ring, a radial tongue on said plate extending through said slot and engaging said operating ring to connect said plate thereto so that rotative movement of said member will move said plate to adjust said diaphragm, and edges of said slot positioned in the path of said tongue to limit the movement thereof to adjust said diaphragm.

4. In an iris diaphragm assembly, the combination with a cylindrical support, a ring formed on said support, a diaphragm positioned in said ring and comprising a diaphragm plate and a diaphragm retainer, a diaphragm operating member mounted for rotative movement on said ring, said ring having a segmental slot extending therethrough, an arcuate lug projecting radially of said retainer and extending into said slot and adapted to engage the opposite edges thereof to hold said retainer against rotation, a radial tongue on said plate extending through said slot and movable therein to adjust said diaphragm, said tongue being adapted to engage said edges to limit the movement of said plate to afford two points of adjustment for said diaphragm, a diaphragm operating ring mounted for rotative movement on said ring, and means for operatively connecting said tongue to said member so that movement of the latter will move said plate to adjust said diaphragm.

5. In an iris diaphragm assembly, the combination with a cylindrical support, a ring formed on said support, a diaphragm positioned in said ring and comprising a diaphragm plate and a diaphragm retainer, a diaphragm operating member mounted for rotative movement on said ring, said ring having a segmental slot extending therethrough, an arcuate lug projecting radially of said retainer and extending into said slot and adapted to engage the opposite edges thereof to hold said retainer against rotation, a radial tongue on said plate extending through said slot and movable therein to adjust said diaphragm, said tongue being adapted to engage said edges to limit the movement of said plate to afford two points of adjustment for said diaphragm, a diaphragm operating ring mounted for rotative movement on said ring, means for operatively connecting said tongue to said member so that movement of the latter will move said plate to adjust said diaphragm, and means both for retaining said diaphragm in position in and rotatively positioning said member on said ring.

6. In an iris diaphragm assembly, the combination with a cylindrical support, a ring formed on said support, a diaphragm positioned in said ring and comprising a diaphragm plate and a diaphragm retainer, a diaphragm operating member mounted for rotative movement on said ring, means for operatively connecting said plate to said member so that rotative movement of the latter will move said plate to adjust said diaphragm, means on said ring adapted to be engaged by said connecting means to provide a limiting positioning means for said diaphragm, and cooperating means on said support and said operating member for providing other positioning means for said diaphragm.

7. In an iris diaphragm assembly, the combination with a cylindrical support, a ring formed on said support, a diaphragm positioned in said ring and comprising a diaphragm plate and a diaphragm retainer, a diaphragm operating member mounted for rotative movement on said ring, means for operatively connecting said plate to said member so that rotative movement of the latter will move said plate to adjust said diaphragm, means on said ring both for holding said retainer against rotation and for limiting the movement of said plate to provide points of adjustment for said diaphragm, and cooperating means on said operating member and said support for providing other positions of adjustment for said diaphragm.

8. In an iris diaphragm assembly, the combination with a cylindrical support, a ring formed on said support, a diaphragm positioned in said ring and comprising a diaphragm plate and a diaphragm retainer, a diaphragm operating member mounted for rotative movement on said ring, means for operatively connecting said plate to said member so that rotative movement of the latter will move said plate to adjust said diaphragm, means on said ring both for holding said retainer against rotation and for limiting the movement of said plate to provide points of adjustment for said diaphragm, said support being formed with a pair of depressions, and a spring pressed ball carried by said operating member and adapted to selectively engage one of said depressions to afford other points of adjustment for said diaphragm.

9. In an iris diaphragm assembly, the combination with a cylindrical support, a ring formed on said support, a diaphragm positioned in said ring and comprising a diaphragm plate and a diaphragm retainer, a diaphragm operating member mounted for rotative movement on said ring, said ring having a segmental slot extending therethrough, an arcuate lug projecting radially of said retainer and extending into said slot and adapted to engage the opposite edges thereof to hold said retainer against rotation, a radial tongue on said plate extending through said slot and movable therein to adjust said diaphragm, said tongue being adapted to engage said edges to limit the movement of said plate to afford two limiting points of adjustment for said diaphragm, a diaphragm operating ring mounted for rotative movement on said ring, means for operatively connecting said tongue to said member so that movement of the latter will move said plate to adjust said diaphragm, said support being formed with a pair of depressions, and a spring pressed ball carried by said operating member and adapted to selectively engage said depressions to provide intermediate points of adjustment for said diaphragm.

10. In an iris diaphragm assembly, the combination with a cylindrical support, a ring formed on said support, a diaphragm positioned in said ring and comprising a diaphragm plate and a diaphragm retainer, a diaphragm operating member mounted for rotative movement on said ring, said ring having a segmental slot extending therethrough, an arcuate lug projecting radially of said retainer and extending into said slot and adapted to engage the opposite edges thereof to hold said retainer against rotation, a radial tongue on said plate extending through said slot and movable therein to adjust said diaphragm, said tongue being adapted to engage said edges to limit the movement of said plate to afford two limiting points of adjustment for said diaphragm, a diaphragm operating ring mounted for rotative movement on said ring, means for operatively connecting said tongue to said member so that movement of the latter will move said plate to adjust said diaphragm, said support being formed with a pair of depressions, a spring pressed ball carried by said operating member and adapted to selectively engage said depressions to provide intermediate points of adjustment for said diaphragm, a lens mount threaded into said ring and engaging said plate to retain said diaphragm in position in said ring, said operating member being formed with a circumferential recess around the inner edge thereof, and an annular rib projecting radially from said mount and arranged to be positioned in said recess to maintain said member in rotative relation on said ring.

CHARLES M. LEE.